Feb. 1, 1949.  M. S. LUNDSTEN  2,460,302
HAND-PIECE CHUCK
Filed Aug. 20, 1945
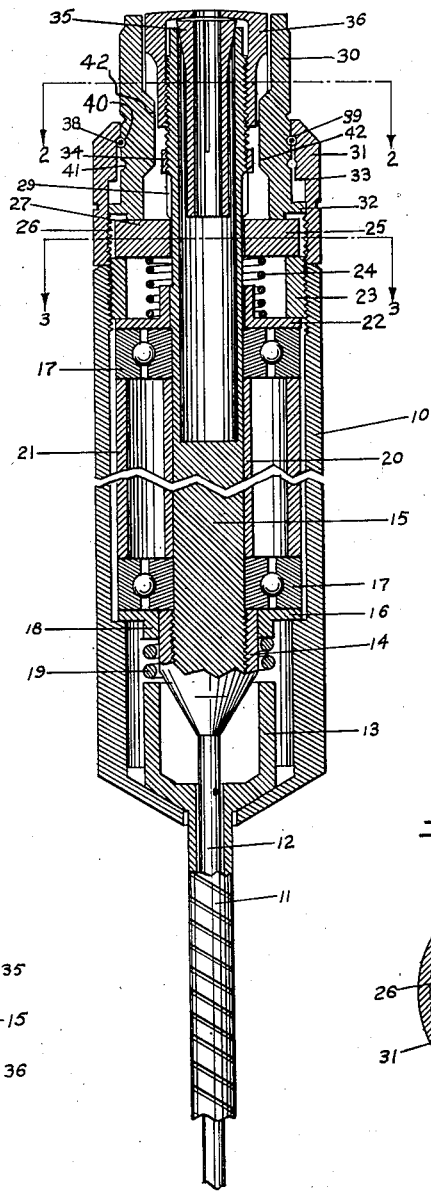
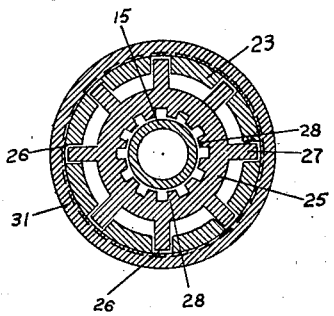
INVENTOR.
Milton S. Lundsten
BY
Ralph L. Chappell
ATTORNEY

UNITED STATES PATENT OFFICE 2,460,302

HAND-PIECE CHUCK

Milton S. Lundsten, United States Navy

Application August 20, 1945, Serial No. 611,675

6 Claims. (Cl. 279—52)

(Granted under the act of March 3, 1883, as amended April 30, 1928; 370 O. G. 757)

This invention relates to flexible shaft handpieces and more particularly to improvements in the collet chuck carried by said flexible handpieces.

An object of this invention is to provide an improved collet chuck for a flexible shaft handpiece.

Another object is to provide a collet chuck that will not require a wrench for tightening said chuck.

Another object is to provide a collet chuck that will afford greater rigidity to the rotating tool held by said collet chuck.

Another object is to provide easy accessibility to that portion of the chuck that holds the collet.

Further objects and advantages of this invention, as well as its construction, arrangement and operation, will be apparent from the following description and claims in connection with the accompanying drawing, in which, Fig. 1 is a central longitudinal section through a collet chuck embodying one form of the present invention, Fig. 2 is a cross section taken along the line 2—2 of Fig. 1, and Fig. 3 is a cross section taken along the line 3—3 of Fig. 1.

A cylindrical housing 10 which is open at its top has a narrow central opening at the bottom, said central opening serving as a passageway for a flexible steel housing 11 which houses a flexible steel cable 12. The widened portion 13 of the flexible steel housing 11 serves to prevent slippage of housing 11 from said central opening and also serves to center the flexible steel cable 12 within the housing 10.

A cable fitting 14 at the tip of the steel cable 12 threadingly engages a central shaft 15. A seal 16 supports a ball bearing 17, the shoulder 18 of said seal 16 urging a coiled spring 19 against the top rim of the widened portion 13 when pressure is exerted downward upon the bearing 17. An inner bearing spacer 20 surrounds the central shaft 15 and another similar spacer 21 separates the outer races of the ball bearings 17. A seal 22 rides atop of the upper bearing 17.

A locking ring 23 threadingly engages the top inner wall of the open portion of the housing 10 and keeps all the elements below it in intimate contact with other immediately adjacent elements. A coiled spring 24 rides atop of seal 22 while the top of said coiled spring abuts against the underside of a locking spider 25. The locking ring 23 has channels 26 cut at spaced intervals into the wall of the upper portion of the locking ring 23 so that the arms 27 of the locking spider 25 can fall into these channels 26 and engage the locknut 23.

The locking spider 25 has internal splines 28 at spaced intervals along its inner periphery, said internal splines 28 engaging the external splines 29 on the shaft 15 when the sliding sleeve 30 is pulled out from the front housing 31 that threadingly engages the outer periphery of the locking ring 23. The shoulder 32 at the base of the sliding sleeve 30 impinges against the protruding lip 33 of the front housing 31 and prevents further upward movement of the sliding sleeve 30.

A shoulder 34 on the shaft 15 limits the upward movement of the locking spider 25. The collet 35 slips into a central opening in the top of the shaft 15, the central opening conforming substantially to the taper of the front end of said collet 35. The collet collar or head 36 is screwed onto the shaft 15, the pressure of the inner face of the collet head upon the top face of the collet 35 increasing the grip of the collet 35 about a mandrel in said collet 35.

A single-coil expansion spring 38 lies in a groove 39 cut into the inner wall of the forward portion of the front housing 31. The single-coil expansion spring 38 acts as a locking means for the sliding sleeve 30. Two similar grooves 40 and 41 are cut in the outer wall of the sliding sleeve 30. By gripping the knurled face of the sliding sleeve 30 and pulling outwardly on said sliding sleeve 30, the forward groove 40 of the sliding sleeve 30 is disengaged from the spring 38 and the rear groove 41 of the sliding sleeve 30 snaps onto the single-coil expansion spring 38 elements 30 and 31 thus constitute an extensible headpiece. When the sliding sleeve 30 is urged downward, the rear groove 41 is disengaged from the spring 38 and the forward groove 40 snaps onto the spring 38. The spring 38 constantly remains in the groove 39. There are internal splines 42 on the sliding sleeve 30 and external splines 43 on the collet head 36, the purpose of which will be clarified in the description of the operation of this device.

In operation, a mandrel or a tool on a spindle is removed from the handpiece chuck by gripping the knurled knob of the sliding sleeve 30 and pulling the latter outwardly from the front housing 31 so that the internal splines 42 of said slide sleeve 30 engage the external splines 43 of the collet head 36; the turning of the sliding sleeve 30 causes the collet head 36 partly to unscrew itself from the shaft 15, loosening the grip of the collet 35 about said mandrel or tool. The securing of a mandrel or tool to the chuck is the reverse process. The sliding sleeve 30 is initially extended, the collet head 36 is turned by turning said sleeve 30 and tightening the grip of the collet 35 about said tool, then pushing said sliding sleeve 30 into said front housing 31 when said tool or mandrel has been gripped tightly by the collet 35.

The replacement of the collet 35 with a different-size collet can be accomplished in two ways. In one way, the knurled face of front housing 31 can be gripped and turned with one hand while the housing 10 is held in the other hand until the front housing 31 is removed from the handpiece. By turning the front housing 31, the internal splines 42 of the sliding sleeve 30 engage the external splines 43 of the collet 35 causing the latter to come off with the front housing 31. The collet 35 is replaced and the front housing 31 with the sliding sleeve 30 already pushed into said front housing 31 is screwed into the locking ring 23.

The other and preferred manner of removing the collet 35 consists of pulling out the sliding sleeve 30 so that it is in an extended state, then turning said sliding sleeve 30 until the collet head 36 is completely unscrewed or disengaged from the shaft 15 so as to permit said collet 35 to be withdrawn from the chuck; the collet 35 is replaced, the collet head 36 is re-inserted into the sliding sleeve 30; an initial turn or two of the partly knurled collet head 36 threadingly engages said collet head 36 to the shaft 15; and the turning of the sliding sleeve 30 further threads the collet head 36 onto the shaft 15. When the collet head 36, now holding a mandrel, is completely threaded onto the shaft 15, the sliding sleeve 30 is pushed into the front housing 31 and the chuck is ready for use.

As the sleeve 30 is in its extended position, the shaft 15 is locked, the arms 27 of the locking spider 25 engaging the channels 26 of the locking spider 25 and the internal splines 28 of the locking ring 25 engaging the external splines 29 of the shaft 15, thus permitting the collet head 36 to be tightened onto a non-rotating or temporarily locked shaft 15.

The present invention, an embodiment of which is shown in the drawings, provides many advantageous and desirable features. The presence of the upper bearings 17 close to the collet head 36 considerably reduces chattering of the shaft 15. The construction of the handpiece chuck in the manner shown permits this advantageous positioning of the bearings 17. Greater rigidity is further accomplished by having a relatively long collet 35 and a firm collet head 36 for tightening the grip of said collet 35 about a mandrel.

The collet 35 can be easily and readily changed without disturbing many parts of the chuck and without going too deeply into the chuck. This simple way of changing the collet manually, without the need of a wrench, is a timesaver in that it eliminates the need to search for wrenches which often have become misplaced. Also, by providing easy accessibility to the collet 35 the present device eliminates undue and time-wasting disassembling of the chuck.

There are no rotating parts of the chuck exposed when in use, thus avoiding inadvertent stopping of the shaft 15 when the latter is in motion. This is very important when fine machining is being done and it is necessary to have a clean sharp cut in or good contact with a material being milled, ground or polished. Moreover, the chuck can be held so that the fingers of the operator using the chuck are close to the very edge of the forward portion of the tool, further adding to the rigidity of said chuck and the accuracy of guiding the tool in its work.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a handpiece chuck, a housing, a collet-supporting rotatable shaft secured in said housing, a shaft-engaging spider slidably mounted on said shaft, partly cutout locking means secured to the forward portion of said housing, an extensible headpiece detachably mounted on said locking means, resilient means for urging said spider into rotation-preventing engagement with said shaft, means on said extensible headpiece for preventing engagement of said spider with said shaft, a collet collar detachably secured to the forward tip of said shaft, and engaging means on said extensible headpiece for aiding in the positioning of said collet collar onto said shaft.

2. In a handpiece chuck, a housing, a collet-supporting splined rotatable shaft secured in said housing, an extensible headpiece detachably secured to said housing so that the outer surface of said headpiece is continuous with the outer surface of said housing, locking means slidably mounted on said splined shaft, resilient means for urging said locking means onto said splines so as to prevent rotation of said shaft with respect to said housing, a collet collar engaging the forward tip of said collet supporting shaft, means on said extensible headpiece for disengaging said shaft from its locked engagement with said housing, and further means on said extensible headpiece for positioning said collet collar onto or removing said collet collar from said shaft.

3. In a handpiece chuck, a housing having an open end, a collet-supporting shaft secured in said housing, bearing means for said shaft, locking means engaging the housing at its open end and being adapted to assist in maintaining said bearing means at a fixed distance along said shaft, splines on said shaft, an extensible headpiece secured to said locking means, a spider lock slidably mounted on said shaft, channels in said locking means to engage the arms of said spider lock, resilient means for urging said spider lock to engage said splines on said shaft while the arms of said spider lock lie in the channels of said locking means, means on said extensible headpiece for disengaging said spider lock from the splines on said shaft when said secured extensible headpiece is in its non-extended state, a collet collar on said collet supporting shaft, and engaging means on said extensible headpiece for aiding in the positioning of said collet collar onto said shaft.

4. In a handpiece chuck, a housing, a rotatable and frontally hollow shaft secured in said housing, locking means detachably secured near the forward end of said housing, said locking means surrounding the rotating shaft and urging all the parts below it that encircle said shaft in intimate contact with one another, a readily detachable extensible headpiece secured to said locking means, the non-extensible outside wall of said headpiece being flush with the outside wall of said housing, splines on said shaft, a locking spider mounted on said shaft and urgeable towards or away from said splines, keyways on said locking means to engage the arms of said locking spider, a collet collar on the forward portion of said shaft, and engaging means on said collet collar engageable by the extended portion of said extensible headpiece, said engagement serving to remove or secure said collet collar to said shaft depending upon the motion of said extended portion with respect to said shaft.

5. A handpiece chuck comprising a hollow housing, a flexible power driven cable having a collet supporting shaft secured thereto, external splines on said shaft, a bearing and oil seal near one end of said shaft, another bearing and oil seal near the other end of said shaft, spacer elements separating said bearings, resilient means for urging said bearings and seals into intimate contact with said spacer elements to form a rigid bearing support for said shaft, a locknut engaging the forward portion of said hollow housing, a spider member slidably mounted on said shaft, the arms of said spider member engaging said locknut, an extensible headpiece secured to said locknut so that the outer surface of said extensible headpiece is continuous with the outer surface of said hollow housing, internal splines on said spider member, resilient means for urging said spider member so that the internal splines of said spider member engage the external splines of said shaft while the arms of said spider member engage said locknut, a collet collar on said shaft, means on said extensible headpiece for disengaging said spider member from the splines of said shaft, and further means on said extensible headpiece for positioning said collet collar onto said shaft or removing said collet collar from said shaft.

6. In a handpiece chuck a rotatable shaft adapted to receive a collet, a collet collar, means adapted at one time to hold said shaft rotatably fixed and at another time to permit said shaft to rotate and means adapted simultaneously to position said collar with respect to said shaft and to cause the first-mentioned means to hold said shaft rotatably fixed, the second-mentioned means being also adapted simultaneously to be free from reaction with said collar and to cause the first-mentioned means to permit said shaft to rotate.

MILTON S. LUNDSTEN.

REFERENCES CITED

The following references are of record in the file of this patent:

UNITED STATES PATENTS

| Number | Name | Date |
| --- | --- | --- |
| 1,850,297 | Volz | Mar. 22, 1932 |
| 2,286,292 | Mall | June 16, 1942 |